United States Patent [19]

Vermeire et al.

[11] Patent Number: 5,278,220
[45] Date of Patent: Jan. 11, 1994

[54] POLYMER COMPOSITIONS

[75] Inventors: Hans F. Vermeire; Hans R. H. Dendooven, both of Ottignies Louvain-la-Neuve, Belgium

[73] Assignee: Shell Oil Company, Houston, Tex.

[21] Appl. No.: 965,302

[22] Filed: Oct. 23, 1992

[30] Foreign Application Priority Data

Nov. 4, 1991 [EP] European Pat. Off. ........ 91202860.2

[51] Int. Cl.$^5$ .......................... C08J 3/18; C08K 5/01; C08L 53/02
[52] U.S. Cl. .................................. 524/490; 524/474; 524/491
[58] Field of Search .................. 524/474, 490, 491

[56] References Cited

U.S. PATENT DOCUMENTS

| | | | |
|---|---|---|---|
| 3,935,893 | 2/1976 | Stang et al. | 152/347 |
| 4,138,378 | 2/1979 | Doss | 260/27 BB |
| 4,361,663 | 11/1982 | Agarwal et al. | 524/62 |
| 4,369,284 | 1/1983 | Chen | 524/476 |
| 4,426,468 | 1/1984 | Ornum et al. | 523/166 |
| 4,617,422 | 10/1986 | Hagger | 174/23 C |
| 4,618,213 | 10/1986 | Chen | 350/96.34 |
| 4,762,878 | 9/1988 | Takeda et al. | 524/490 |
| 4,942,270 | 7/1990 | Gamarra | 174/93 |
| 4,968,748 | 11/1990 | Thompson et al. | 525/92 |

FOREIGN PATENT DOCUMENTS

| | | |
|---|---|---|
| 63-213586 | 9/1988 | Japan . |
| 1-065149 | 3/1989 | Japan . |
| 2250295A | 2/1993 | United Kingdom . |

*Primary Examiner*—Paul R. Michl
*Assistant Examiner*—U. K. Rajguru

[57] ABSTRACT

Improved properties during aging are demonstrated by thermoplastic polymer compositions comprising selectively hydrogenated vinylaromatic compound/conjugated alkadiene block copolymer, thermoplastic engineering polymer and a poly(alkylene) plasticizer.

14 Claims, No Drawings

POLYMER COMPOSITIONS

FIELD OF THE INVENTION

This invention relates to improved polymeric Compositions containing thermoplastic engineering polymer, selectively hydrogenated vinylaromatic compound/conjugated alkadiene block copolymer and particular polyalkylene plasticizer.

BACKGROUND OF THE INVENTION

A variety of compositions containing vinylaromatic compound/conjugated alkadiene block copolymers and selectively hydrogenated derivatives thereof are known wherein other polymeric materials, particularly poly(alkylene) polymers, are also present.

Doss, U.S. 4,138,378, discloses sealant compositions comprising hydrogenated vinylaromatic compound/conjugated alkadiene elastomers, a low molecular weight polyalkylene plasticizer, a modifying resin and an inorganic filler. U.S. 4,176,240 describes a filler material comprising a styrene-butylene.styrene block copolymer dissolved in white mineral oil and polyethylene. Agarwal et al, U.S. 4,361,663, discloses a composition comprising the selectively hydrogenated block copolymer, a polybutylene, a hydrocarbon resin, aliphatic olefinic compounds, cyclic olefins and hydrogenated polycyclic compounds. Hagger, U.S. 4,617,422, shows a filling medium for telecommunication cables comprising a hydrocarbon base including a mineral oil and a polyalkylene soluble therein, the partially hydrogenated block copolymer and a miscible hydrocarbon material.

Chen, U.S. 4,618,213, illustrates gelatinous elastomer compositions comprising a selectively hydrogenated triblock copolymer of styrene and butadiene and an excess by weight of a plasticizing oil. U.S. 4,716,183 discloses adhesive compositions comprising a hydrocarbon oil and a mixture of two selectively hydrogenated styrene/butadiene triblock polymers of particular composition in a particular weight ratio. Gamarra, U.S. 4,942,270, provides cable sealing compositions having a minor proportion of the selectively hydrogenated triblock copolymer and a major proportion of a hydrocarbon oil as plasticizer. In Japanese patent application No. 63213586A there is described a composition containing a triblock copolymer or selectively hydrogenated derivative, a tackifier resin and a plasticizer of wax, low molecular weight polyolefin or liquid hydrocarbon. Japanese Patent Application No. 01065149A describes a composition of an olefinic thermoplastic elastomer, a triblock vinylaromatic compound/conjugated alkadiene polymer and a low molecular weight polyisobutylene plasticizer. In British Patent Specification No. 1,467,463 are disclosed polymeric compositions containing (A) selectively hydrogenated vinylaromatic compound/conjugated alkadiene polymer or ethylene/propylene block copolymer, (B) normally solid polypropylene, (C) hydrocarbon extending oil and (D) petroleum hydrocarbon wax. From British Patent Specification 1, 560,896 it is known to retard extender oil bleedout from selectively hydrogenated block copolymer/polyolefin compositions by using sterically hindered phenols and benzotriazoles.

From trade literature of Shell Chemical Co., particularly Shell Technical Bulletin No. SC 65- 75, blends of selectively hydrogenated styrene/butadiene/styrene block polymers are known where the other blend components are butyl rubber, tackifier, filler and oil. The physical properties of such polymer blends are not shown as desirable.

The above references teach a number of polymeric I0 compositions used for a number of purposes. However, there are many applications of the selectively hydrogenated block copolymers where the compositions of these references are not suitable because of inadequate physical properties, e.g., applications such as elastic films used in the medical area and grips for golf clubs, rackets and fishing rods in the sporting goods field. A principal problem with the compositions of the above references is the loss of the currently used plasticizer oils, as by bleedout, from compositions exposed to heat and/or light during aging with attendant reduction of desirable physical properties. It would be of advantage to have compositions containing the selectively hydrogenated vinylaromatic compound/conjugated alkadiene block copolymers which exhibit and retain improved physical properties.

SUMMARY OF THE INVENTION

The present invention provides improved elastomeric compositions containing selectively hydrogenated vinylaromatic compound/conjugated alkadiene block copolymers. More particularly, the present invention provides polymeric compositions containing the block copolymer, a thermoplastic engineering polymer and a poly(alkylene) plasticizer of particular type. The compositions exhibit improved physical properties, as compared to prior art compositions, including the retention during aging of tensile strength, color stability and low volatility upon exposure to heat and/or light. These properties permit utilization of the compositions in applications where earlier compositions have not proven satisfactory.

DESCRIPTION OF THE INVENTION

The selectively hydrogenated block copolymer is derived from a block copolymer containing at least one block of at least predominantly polymerized vinylaromatic hydrocarbon compound and at least one block of at least predominantly polymerized conjugated alkadiene. The vinylaromatic hydrocarbon monomer of such block copolymer is styrene or a hydrocarbyl.substituted styrene of up to 18 carbon atoms inclusive. Illustrative of these vinylaromatic hydrocarbons are styrene, p-methylstyrene, p-octylstyrene, m-isopropylstyrene, α-methylstyrene and α,4-dimethylstyrene. Of the vinylaromatic hydrocarbon compounds, styrene and α-methylstyrene are preferred, especially styrene. The conjugated alkadiene monomer is 1,3-butadiene (butadiene) or a hydrocarbyl-substituted butadiene of up to 8 carbon atoms inclusive such as 2-methyl -1,3-butadiene (isoprene), 1,3-pentadiene, 2-methyl-1,3-hexadiene and 1,3-octadiene.

The production of block copolymers of vinylaromatic hydrocarbon and conjugated alkadiene is well known and conventional in the art as are methods of controlling the molecular weight of the blocks, the configuration of the polymerized alkadiene block and the overall configuration of the block copolymer.

In one modification, a linear block copolymer is produced as by sequential polymerization of the blocks. By way of example, a block of polymerized vinylaromatic hydrocarbon is produced in the presence of a polymerization initiator which typically is an alkyllithium compound of up to 4 carbon atoms. The result is a lithium-capped polymer of the vinylaromatic hydrocarbon. Although a mixture of vinylaromatic hydrocarbons is used to prepare a mixed block, it is generally preferred that a single vinylaromatic hydrocarbon be utilized. To the lithium-capped polymer is provided conjugated alkadiene to "grow" a block of polymerized alkadiene onto the block of polymerized vinylaromatic hydrocarbon compound. Complete polymerization of the vinylaromatic hydrocarbon prior to addition of the conjugated alkadiene results in the formation of rather discrete blocks. Alternatively, provision of conjugated alkadiene prior to complete vinylaromatic hydrocarbon polymerization results in mixed blocks termed "tapered" which are satisfactory but less preferred.

Within the production of polymerized conjugated alkadiene, two types of polymerization are possible. In what is termed 1,2-polymerization, one carbon-carbon double bond of the conjugated alkadiene is involved in production of the polymeric chain which then has pendant vinyl groups. In what is termed 1,4-production of the polymeric chain which will include ethylenic unsaturation. Control of these polymerization types is well understood in the art.

The product of the conjugated alkadiene polymerization is contacted with additional vinylaromatic compound if a block copolymer of three blocks is desired. Alternatively, the two-block reactive or "living" polymer is contacted with an active hydrogen compound to terminate polymerization, thereby forming a two-block or diblock polymer, or is reacted with a coupling agent to form a polymeric product of higher molecular weight. Use of a difunctional coupling agent produces a linear polymer whereas use of a curing agent with a functionality of three or more, e.g., polyvinylaromatic compounds, silicon tetrahalides or alkyl esters of dicarboxylic acids, produces block copolymers termed "star", "radial", or "branched", respectively. If desired, polymers of more than three blocks are produced by repeating the above stepwise polymerization.

The structure and chemical nature of the block copolymers is described by a conventional form of nomenclature. A vinylaromatic hydrocarbon block is termed an "A" block or an "S" block if prepared from styrene. A conjugated alkadiene block is termed a "B" block. This term also applies to a block prepared from butadiene, and a block of polymerized isoprene is termed an "I" block. Thus, a linear three-block or triblock polymer is broadly termed ABA, or SBS if prepared from styrene and butadiene. The corresponding diblock polymer is broadly termed AB and is termed SB if produced from styrene and butadiene. A linear triblock of styrene and isoprene is termed an SIS block.

In the compositions of the invention, the selectively hydrogenated block polymers are preferably derivatives of linear triblock polymers such as SBS or SIS, or of star polymers conventionally identified as (SB)$_n$ or (SI)$_n$ where n is the number of "arms" on the star. It is also preferred that the apparent molecular weight of the A blocks is from 7500 to about 50,000 and the apparent molecular weight of the B blocks is from about 25,000 to about 500,000. The total A blocks will preferably be from about 27% to about 65% of the total apparent molecular weight of the polymer. The term "apparent molecular weight" represents the I5 molecular weight obtained by using gel permeation chromatography with polystyrene standards.

To produce the selectively hydrogenated block copolymers the block copolymers of vinylaromatic hydrocarbon and conjugated alkadiene are hydrogenated under conditions which hydrogenate no more than about 25% and preferably no more than about 5% of the aromatic unsaturation present while hydrogenating from about 80% to about 99% of the aliphatic unsaturation present. Such hydrogenation is accomplished by conventional methods well known in the art. The selectively hydrogenated block copolymer is often identified by the "apparent" structure of the aliphatic block. Thus, selective hydrogenation of a SBS polymer will result in the production of a polymer having a midblock which is apparently polyethylene in the case of a midblock produced by 1,4-polymerization and ethylene/butylene copolymer in the case of a midblock produced with predominantly 1,2-polymerization. These selectively hydrogenated block copolymers are indicated by SES and SEBS respectively. The polymer produced by selective hydrogenation of a SIS copolymer of a high degree of 1,4-polymerization is termed SEPS because of the similarity of the hydrogenated midblock to an ethylene/propylene copolymer. Similar nomenclature applies to polymers with a different number of blocks or a geometrical configuration other than linear. Such nomenclature is conventional and well understood in the art.

The partially hydrogenated block copolymers of vinylaromatic hydrocarbon are conventional and a number are commercial, being marketed by Shell Chemical Company as KRATON G ®-1650 Thermoplastic Rubber, KRATON G-1654X Thermoplastic Rubber, KRATON G-1651 Thermoplastic Rubber and KRATON G 1652 Thermoplastic Rubber. Mixtures of partially hydrogenated block copolymers are also satisfactory.

The thermoplastic engineering polymer component of the compositions is a polyalkylene polymer, a poly(vinyl aromatic) polymer or a polyphenylene ether. Such materials are broadly conventional and many are commercial. The preferred poly(vinyl aromatic) polymer is polystyrene or poly(α-methylstyrene), particularly polystyrene. The preferred thermoplastic engineering polymer, however, is a polyalkylene wherein the alkylene has from 2 to 4 carbon atoms, inclusive, particularly polyethylene or polypropylene. The preferred polyalkylenes have a weight average molecular weight above about 6000 and, in the case of polypropylene, are isotactic. Best results are obtained if the thermoplastic engineering polymer is a polypropylene having a nominal melt flow from 0.2 dg/min to 20 dg/min, preferably from 0.5 dg/min to 12 dg/min, as determined by ASTM method D 1238 at 230° C. and a 2.16 kg load. These polymers are further characterized by a density from 0.902 g/cc to 0.910 g/cc at 22.8° C. and a flex modulus from 8780 g/cm$^2$ to 17,580 g/cm$^2$.

The amount of thermoplastic engineering polymer to be employed in the compositions of the invention is suitably from about 5 parts by weight to about 500 parts by weight per 100 parts by weight of the vinylaromatic compound/conjugated alkadiene block copolymer. Preferred quantities of thermoplastic engineering polymer are from about 25 parts by weight to about 250 parts by weight per 100 parts by weight of block copolymer.

The poly(alkylene) plasticizer present as a third component of the composition of the invention is a liquid low molecular weight polymer of propylene, 1-butene or isobutylene or mixtures thereof. Preferred plasticizer is a low molecular weight polymer of 1-butene or isobutylene. The plasticizer has a number average molecular weight from about 1200 to about 4500, preferably from about 2000 to about 3500. The plasticizer is further characterized by a ratio of $M_W/M_n$ of from 1.0 to 3.0, preferably from about 1.2 to about 2.4 wherein $M_W$ and $M_n$ are the weight average molecular weight and the number average molecular weight, respectively. These low molecular weight poly(alkylenes) are conventional and a number are commercial. Illustrative of such polybutylenes are HYVIS 200® and NAPVIS 30® marketed by BP Chemicals, Ltd.

Also suitable as the plasticizer is a class of poly(aryl-substituted alkylenes) derived predominantly from α-methylstyrene. These polymers are marketed by Hercules under the trademark KRISTALEX® and are characterized by ring and ball softening points between 20° C. and 140° C., preferably between 60° C. and 120° C., as determined by ASTM-E28.

The quantity of the plasticizer to be employed in the compositions of the invention is from about 5 parts by weight to about 200 parts by weight per 100 parts by weight of the block copolymer. Preferred quantities of plasticizer are from about 50 parts by weight to about 100 parts by weight per 100 parts by weight of the block copolymer.

In order to obtain particular properties for particular applications, a variety of conventional materials are optionally added to the compositions of the invention. In order to provide reinforcement, fillers are incorporated within the compositions of the invention. Illustrative of such fillers are talc, mica or glass fibers. The presence of such fillers is optional, and quantities of filler from 0 parts per weight to about 500 parts per weight per 100 parts by weight of block copolymer are satisfactory. When filler is present, quantities from about 50 parts by weight to about 250 parts by weight per 100 parts by weight of block copolymer are preferred.

Also suitably but optionally present in the compositions of the invention are conventional additives such as flame retardants, antioxidants, stabilizers, colorants and dyes. Quantities of such additives up to about 50 parts by weight per 100 parts by weight of block copolymer are satisfactory.

The method of preparing the compositions of the invention is conventional. The components of a composition are combined and mixed in a conventional mixing device. In one preferred modification, however, all components except the poly(alkylene plasticizer are preblended to form a masterbatch and then blended with the plasticizer in an internal mixer operating at high shear. In an alternate preferred modification, the components other than plasticizer are preblended in an extruder and plasticizer is then injected at a somewhat higher temperature.

The polymer compositions are thermoplastic and are processed by methods conventional for thermoplastic polymers. By way of illustration, the compositions are formed into a sheet on a rolling mill. The resulting sheet is chopped or granulated and the granulate is used for injection molding or compression molding of shaped articles.

The compositions of the invention are characterized by improved properties such as retention of tensile strength and flow rate in combination with color retention and low volatility during aging when exposed to heat and light over long periods of time, as compared with related compositions of the prior art. Such improved properties provide better performance in applications such as medical, wire and cable coating, automotive and floor and roofing and in sporting goods applications such as grips for fishing rods and golf clubs.

The invention is further illustrated by the following Comparative Examples (not of the invention) and the Illustrative Embodiments which should not be regarded as limiting.

Composition Preparation

A number of compositions were prepared for evaluation by the following procedures. A masterbatch was obtained by preblending the block copolymer, the thermoplastic engineering polymer, filler and additives in the specified amounts in an internal mixer and the masterbatch was melt-blended with plasticizer in an internal mixer operating at high shear. The resulting polymer blend was formed into a sheet on a rolling mill, chopped and then granulated. The granulated material was used to prepare shaped articles as by extrusion or injection molding. Alternatively, the plasticizer was injected into an extruder in which the masterbatch had previously been prepared.

In the Comparative Examples and Illustrative Embodiments the following materials, identified below by trademark or trade name and source, were employed.

| | |
|---|---|
| KRATON G ®-1650 | Medium $MW_n$ selectively hydrogenated styrene-butadiene-styrene block copolymer - Shell Chemical Company |
| KRATON G-1651 | High $MW_{(n)}$ selectively hydrogenated styrene-butadiene-styrene block copolymer - Shell Chemical Company |
| KRATON G-1652 | Low $MW_n$ selectively hydrogenated styrene-butadiene-styrene block copolymer - Shell Chemical Company |
| WITCO ® 260 | Paraffinic oil - Witco Chemicals |
| NAPVIS ® 30 | Polyisobutylene, $M_n = 1250$, $M_w/M_n = 1.9$ - BP Chemicals |
| HYVIS ® 200 | Polyisobutylene, $M_n = 2450$, $M_w/M_n = 2.0$ - BP Chemicals |
| IRGANOX ® 1010 | Antioxidant - Ciba-Geigy |
| KRISTALEX ® F120 | Resin largely derived from α-methylstyrene - Hercules |
| PP SM 6100 | Polypropylene Homopolymer - Shell Chemical Co., Ltd. |
| TINUVIN ® 327 | U.V. stabilizer - Ciba-Geigy |
| PETROTHENE ® NA386 | Linear low density polyethylene - USI Chemicals |
| IRGANOX PS 800 | Dilauryl ester of β,β-thiodipropionic acid - Ciba-Geigy |
| DURCAL ® 5 | Filler material - Omya |
| EPON ® 1004 | Epoxy resin - Shell Chemical Company |

Illustrative Embodiment 1

A preblend of 100 pbw (parts by weight) of KRATON G 1650, 50 pbw of PP SM 6610, 20 pbw KRISTALEX F 120, 0.2 pbw IRGANOX 1010 and 0.5 pbw of IRGANOX PS 800 was prepared using a Papenmeier mixer for 20 minutes at room temperature and the resulting mass was mixed in a Berstorff 25 mm co-rotating twin-screw extruder. The extrudate was cooled in a water bath and granulated in a Reeves granulator.

To the resulting granulate were added 75 pbw of HYVIS 200 during melt-blending in a Pomini Farrell PL 4.3 internal mixer. An overload volume of 10% was used to create a floating ram mixing condition and the rotor speed was 150 rpm. The resulting mixture was placed on the warm (80° C.) rolls of a Schwabyentan 300 L mil for cooling and subsequent sheeting into sheets of 1.5 thickness.

The sheet was cooled to room temperature and subsequently granulated through a Sagitta dicer. The resulting composition was injection molded into 150 mm ×150 mm ×2 mm test plates using a Demag D 150 injection molder.

The mold cavity was fan-gated over one side to give a well defined flow pattern during molding. The plates allowed physical properties to be measured parallel (molding direction MD) and perpendicular to melt flow direction (molding direction PMD) to evaluate the degree of aniostropy in an injection molded specimen. The injection molded plates were conditioned after molding for at least 16 hours in a standard atmosphere (T=23° C., 50% humidity) before testing.

Illustrative Embodiments 2.9-9

Comparative Experiments A-C

Additional compositions were prepared by the procedure of Illustrative Embodiment I, except that the components and in some cases the quantities of components were varied. The compositions are described in Table I.

strength, elongation at break, tensile set and set at break. The distance between the bench markers on the dumbbells was 25 mm. The crosshead speed of the Zwick Mechanical Tester was 500 mm/min except for measuring tensile strength where the speed was set according to ASTM D412. The results of measuring these properties is shown in Table II.

Angle test pieces without nick were prepared, according to ASTMD-624, from the conditioned plates. These test pieces were used to measure unnicked angle tear strength. The crosshead speed of the Mechanical Tester was 500 mm/min. The results are shown in Table II.

The indentation Shore A hardness was measured according to ASTM D2240 with a Durometer on a stack of three 2mm thick samples after O s (initial indentation) and also after 30 s. The results are shown in Table II.

The Melt Flow Rate (MFR), according to ASTM D1238, measures the rate of extrusion of molten polymeric compositions through a well defined die under prescribed conditions of temperature and load. A Davenport extrusion plastometer was used to evaluate the compositions under condition "G" (200° C., 5 kg) and-

TABLE I

| Composition | (1) | (2) | (3) | (A) | (4) | (5) | (6) | (B) | (7) | (8) | (9) | (C) |
|---|---|---|---|---|---|---|---|---|---|---|---|---|
| KRATON G-1650 | 100 | 100 | 100 | 100 | | | | | | | | |
| KRATON G-1651 | | | | | 100 | 100 | 100 | 100 | | | | |
| KRATON G-1652 | | | | | | | | | 100 | 100 | 100 | 100 |
| HYVIS 200 | 75 | 100 | 125 | | 75 | 100 | | | 75 | 100 | | |
| NAPVIS 30 | | | | | | | 100 | | | | 100 | |
| WITCO 260 oil | | | | 100 | | | | 100 | | | | 100 |
| PP SM 6100 | 50 | 50 | 50 | 50 | 50 | 50 | 50 | 50 | 50 | 50 | 50 | 50 |
| KRISTALEX F 120 | 20 | 20 | 20 | 20 | 20 | 20 | 20 | 20 | 20 | 20 | 20 | 20 |
| IRGANOX 1010 | 0.2 | 0.2 | 0.2 | 0.2 | 0.2 | 0.2 | 0.2 | 0.2 | 0.2 | 0.2 | 0.2 | 0.2 |
| IRGANOX PS 800 | 0.5 | 0.5 | 0.5 | 0.5 | 0.5 | 0.5 | 0.5 | 0.5 | 0.5 | 0.5 | 0.5 | 0.5 |

Evaluation

/or under condition "E" (190° C./2.16 kg). The results of these measurements are shown in Table II.

TABLE II

| Composition | (1) | (2) | (3) | (A) | (4) | (5) | (6) | (B) | (7) | (8) | (9) | (C) |
|---|---|---|---|---|---|---|---|---|---|---|---|---|
| Hardness Shore A | | | | | | | | | | | | |
| 0 (s) | 81 | 78 | 72 | 72 | 81 | 77 | 76 | 74 | 81 | 73 | 71 | 72 |
| 30 (s) | 78 | 73 | 65 | 69 | 77 | 73 | 73 | 71 | 78 | 68 | 68 | 69 |
| MFR"G" (g/10 min) | 13 | 65 | >100 | >100 | 17 | 70 | 30 | 15 | — | — | — | — |
| MFR"E" (g/10 min) | 0.8 | 5 | 11 | 10 | 0.3 | 4.6 | 0.7 | 0.08 | 10.6 | 35.4 | 26.7 | — |
| MD | | | | | | | | | | | | |
| Tensile strength (MPa) | 10.6 | 5.0 | 3.9 | 8.8 | 8.6 | 6.6 | 9.4 | 7.9 | 10.9 | 7.8 | 9.0 | 4.8 |
| Modulus 100% (MPa) | 3.9 | 3.2 | 2.8 | 3.7 | 3.6 | 3.3 | 3.2 | 2.7 | 5.6 | 3.7 | 4.1 | 3.8 |
| Modulus 300% (MPa) | 5.7 | 4.3 | 3.6 | 4.9 | 5.6 | 4.8 | 4.9 | 4.1 | 7.2 | 5.0 | 5.4 | 4.8 |
| Modulus 500% (MPa) | 8.8 | 5.7 | — | 6.9 | — | — | 8.7 | 6.6 | 9.9 | 7.0 | 7.5 | — |
| Elongation @ break (%) | 570 | 470 | 450 | 680 | 480 | 460 | 530 | 570 | 610 | 620 | 680 | 400 |
| Tear strength (kN/m) | 47 | 33 | 25 | 43 | 39 | 33 | 37 | 37 | 60 | 44 | 46 | 29 |
| Tensile set (%) | 20 | 18 | 20 | 16 | 22 | 23 | 23 | 19 | 21 | 18 | 23 | 20 |
| Set at break (%) | 69 | 78 | 46 | 84 | 68 | 70 | 82 | 80 | 100 | 74 | 92 | 48 |
| PMD | | | | | | | | | | | | |
| Tensile strength (MPa) | 11.9 | 5.5 | 3.3 | 9.1 | 10.3 | 7.9 | 11.7 | 12.9 | 11.3 | 8.0 | 8.5 | 3.9 |
| Modulus 100% (MPa) | 3.2 | 2.6 | 2.0 | 2.4 | 2.9 | 2.5 | 2.6 | 2.3 | 3.7 | 2.7 | 2.6 | 2.0 |
| Modulus 300% (MPa) | 4.8 | 3.7 | 2.8 | 4.0 | 4.8 | 4.0 | 4.2 | 3.5 | 5.4 | 3.9 | 4.1 | 3.7 |
| Modulus 500% (MPa) | 8.1 | 5.1 | 3.7 | 6.3 | 8.9 | 6.9 | 8.1 | 5.8 | 9.0 | 6.2 | 6.5 | — |
| Elongation @ break (%) | 620 | 550 | 500 | 680 | 550 | 560 | 600 | 730 | 610 | 630 | 620 | 390 |
| Tear strength (kN/m) | 49 | 33 | 24 | 40 | 39 | 34 | 39 | 39 | 60 | 44 | 43 | 25 |
| Tensile set (%) | 16 | 18 | 17 | 10 | 22 | 22 | 17 | 17 | 17 | 13 | 12 | 9 |
| Set at break (%) | 48 | 94 | 52 | 58 | 98 | 94 | 118 | 128 | 96 | 60 | 108 | 14 |

The physical properties of the compositions of Illustrative Embodiment I-IX and Comparative Experiments A-C were determined. Type C dumbbells described in ASTM D412 were cut from the conditional injection molded plates. These dumbbells were used to measure the stress/strain properties of moduli, tensile Test samples in the form of 4.46 mm circular disks were cut from injection moded test plates of compositions 1, 6, 7, 9, A and B. The samples were placed in a circulating air oven at a constant temperature of 120° C. for a period of up to 12 weeks. At the end of each two week period, the samples were weighed and measured.

Table III depicts the changes in weight of the samples. Table IV reports the linear shrinkage of the circular test pieces.

TABLE III

| Composition, number of weeks | Weight Loss, % |
|---|---|
| (A) 2 | 2 |
| 12 | 7.1 |
| (1) 2 | 0.4 |
| 12 | 1 |
| (B) 2 | 3.2 |
| 12 | 10.4 |
| (6) 2 | 1.9 |
| 12 | 2.8 |
| (7) 2 | 0.3 |
| 12 | 0.6 |
| (9) 2 | 0.6 |
| 12 | 2.6 |

TABLE IV

| Composition, number of weeks | % Shrinkage |
|---|---|
| (A) 2 | 7 |
| (1) 2 | 2.6 |
| (B) 2 | 2.6 |
| 4 | 5 |
| 6 | 6.8 |
| 12 | 7.2 |
| (6) 2 | 2.6 |
| (7) 2 | 2.6 |
| 4 | 2.8 |
| (9) 2 | 2.6 |
| 4 | 3.6 |
| 6 | 4.4 |

Injection molded plates of several of the above compositions were aged as described above. Ever 4 weeks type C dumbbells and angle tear pieces were cut from the plates and used to determine physical properties of the composition. The results are shown in Tables V and VI.

TABLE VI

| Composition | (A) | | | (B) | | |
|---|---|---|---|---|---|---|
| Aging time (weeks) | 4 | 8 | 12 | 4 | 8 | 12 |
| Hardness Shore A | | | | | | |
| 0 (s) | 71 | 72 | 74 | 76 | 78 | 80 |
| 30 (s) | 67 | 69 | 72 | 73 | 75 | 77 |
| MD | | | | | | |
| Tensile strength (MPa) | 7.6 | 7.7 | 8.4 | 10.3 | 11.1 | 11.2 |
| Modulus 100% (MPa) | 4.3 | 4.3 | 4.7 | 3.4 | 3.5 | 3.5 |
| Modulus 300% (MPa) | 5.5 | 5.6 | 5.9 | 4.9 | 5.2 | 5.1 |
| Elongation @ break (%) | 640 | 600 | 600 | 610 | 600 | 560 |
| Tear strength (kN/m) | 42 | 37 | 49 | 40 | 42 | 46 |
| Tensile set (%) | 12 | 18 | 18 | 16 | 14 | 19 |
| Set at break (%) | 58 | 70 | 68 | 32 | 108 | 51 |
| PMD | | | | | | |
| Tensile strength (MPa) | 8.3 | 8.5 | 8.9 | 13 | 15.5 | 15.9 |
| Modulus 100% (MPa) | 3.6 | 2.7 | 2.8 | 2.6 | 2.7 | 2.8 |
| Modulus 300% (MPa) | 5.2 | 4.0 | 4.3 | 4.1 | 4.2 | 4.4 |
| Elongation @ break (%) | 630 | 620 | 610 | 680 | 690 | 690 |
| Tear strength (kN/m) | 46 | 45 | 44 | 40 | 44 | 44 |
| Tensile set (%) | 10 | 14 | 12 | 14 | 14 | 17 |
| Set at break (%) | 46 | 50 | 52 | 92 | 110 | 112 |

Illustrative Embodiments 10-18

Compositions were prepared by the procedure of Illustrative Embodiment 1 having the proportions of materials specified in Table VII. Except for the HYVIS 200, the preblend contained all the specified materials.

The physical properties of compositions 10-18 are shown in Table VIII.

TABLE V

| Composition | (1) | | | (6) | | | (7) | | | (9) | | |
|---|---|---|---|---|---|---|---|---|---|---|---|---|
| Aging time (weeks) | 4 | 8 | 12 | 4 | 8 | 12 | 4 | 8 | 12 | 4 | 8 | 12 |
| Hardness Shore A | | | | | | | | | | | | |
| 0 (s) | 81.5 | 79 | 82 | 78 | 76 | 78 | 80 | 79 | 82 | 70 | 72 | 73 |
| 30 (s) | 74 | 75 | 78 | 71 | 72 | 75 | 74 | 75 | 79 | 67 | 69 | 70 |
| MD | | | | | | | | | | | | |
| Tensile strength (MPa) | 9.7 | 10 | 10 | 7.4 | 7.5 | 8.2 | 10.1 | 10.8 | 10.4 | 7.0 | 7.3 | 6.9 |
| Modulus 100% (MPa) | 4.0 | 4.1 | 4.3 | 3.4 | 3.6 | 3.6 | 7.3 | 5.8 | 5.6 | 4.1 | 4.4 | 4.3 |
| Modulus 300% (MPa) | 5.2 | 5.3 | 5.5 | 5.3 | 5.4 | 5.4 | 5.7 | 7.4 | 7.3 | 5.2 | 5.6 | 5.4 |
| Elongation @ break (%) | 560 | 570 | 560 | 510 | 450 | 470 | 590 | 580 | 610 | 580 | 580 | 600 |
| Tear strength (kN/m) | 44 | 44 | 46 | 39 | 38 | 38 | 57 | 59 | 57 | 43 | 45 | 44 |
| Tensile set (%) | 19 | 20 | 20 | 16 | 18 | 18 | 27 | 26 | 24 | 22 | 22 | 20 |
| Set at break (%) | 66 | 72 | 64 | 54 | 44 | 40 | 74 | 90 | 80 | 58 | 64 | 52 |
| PMD | | | | | | | | | | | | |
| Tensile strength (MPa) | 10.4 | 10.1 | 10.5 | 11.8 | 11.4 | 12.4 | 10.1 | 9.7 | 10.2 | 6.9 | 7.2 | 7.8 |
| Modulus 100% (MPa) | 3.2 | 3.2 | 3.2 | 2.8 | 2.8 | 2.8 | 3.6 | 3.6 | 3.5 | 2.6 | 2.5 | 2.7 |
| Modulus 300% (MPa) | 4.4 | 4.5 | 4.5 | 4.7 | 4.7 | 4.6 | 5.2 | 5.2 | 5.1 | 3.7 | 3.8 | 3.8 |
| Elongation @ break (%) | 620 | 600 | 600 | 590 | 570 | 600 | 560 | 560 | 580 | 580 | 570 | 590 |
| Tear strength (kN/m) | 46 | 46 | 49 | 38 | 39 | 39 | 56 | 56 | 54 | 40 | 42 | 40 |
| Tensile set (%) | 18 | 22 | 18 | 16 | 20 | 17 | 22 | 20 | 18 | 12 | 14 | 16 |
| Set at break (%) | 88 | 80 | 80 | 84 | 72 | 90 | 74 | 66 | 70 | 52 | 44 | 48 |

TABLE VII

| Composition | (10) | (11) | (12) | (13) | (14) | (15) | (16) | (17) | (18) |
|---|---|---|---|---|---|---|---|---|---|
| KRATON G-1650 | 100 | 100 | 100 | 100 | 100 | 100 | 100 | 100 | 100 |
| HYVIS 200 | 75 | 75 | 75 | 100 | 100 | 100 | 125 | 125 | 125 |
| PETROTHENE NA 386 | 40 | 60 | 80 | 40 | 60 | 80 | 40 | 60 | 80 |
| DURCAL 5 (filler) | 180 | 180 | 180 | 180 | 180 | 180 | 180 | 180 | 180 |
| IRGANOX 1010 | 0.4 | 0.4 | 0.4 | 0.4 | 0.4 | 0.4 | 0.4 | 0.4 | 0.4 |
| TINUVIN 327 | 1.25 | 1.25 | 1.25 | 1.25 | 1.25 | 1.25 | 1.25 | 1.25 | 1.25 |
| EPON 1004 | 2 | 2 | 2 | 2 | 2 | 2 | 2 | 2 | 2 |

TABLE VIII

| Composition | (10) | (11) | (12) | (13) | (14) | (15) | (16) | (17) | (18) |
|---|---|---|---|---|---|---|---|---|---|
| Hardness Shore A | 56 | 61 | 64 | 50 | 56 | 60 | 42 | 49 | 55 |
| MFR "G" (g/10 min) | 2.3 | 1.8 | 1.7 | 7.1 | 6.0 | 3.9 | 13 | 9.1 | 8.8 |
| Compression Set (%) | | | | | | | | | |
| 22 h, 100° C. | 100 | 100 | 98 | 100 | 97 | 96 | 100 | 97 | 95 |
| 72 h, 70° C. | 79 | 78 | 75 | 79 | 76 | 73 | 70 | 69 | 69 |
| 168 h, 23° C. | 20 | 21 | 22 | 20 | 21 | 22 | 13 | 17 | 21 |
| MD | | | | | | | | | |
| Modulus 300% (MPa) | 4.3 | 4.9 | 5.4 | 3.7 | 4.2 | 4.8 | 2.5 | 3.3 | 4.0 |
| Tensile strength (MPa) | 6.0 | 7.1 | 7.6 | 4.2 | 5.1 | 5.4 | 2.5 | 3.4 | 4.3 |
| Elongation @ break (%) | 530 | 540 | 530 | 450 | 460 | 460 | 350 | 370 | 400 |
| Tear strength (kN/m) | 36 | 42 | 46 | 29 | 33 | 39 | 20 | 26 | 33 |
| Set at break (%) | 72 | 88 | 112 | 56 | 72 | 92 | 36 | 52 | 72 |
| PMD | | | | | | | | | |
| Modulus 300% (MPa) | 3.8 | 4.3 | 4.7 | 3.4 | 3.7 | 4.1 | 2.6 | 3.1 | 3.5 |
| Tensile strength (MPa) | 9.0 | 11 | 11.3 | 6.7 | 7.8 | 8.8 | 3.5 | 5.0 | 6.9 |
| Elongation at break (%) | 660 | 670 | 670 | 650 | 660 | 690 | 600 | 620 | 670 |
| Tear strength (kN/m) | 41 | 47 | 51 | 34 | 39 | 43 | 24 | 31 | 37 |
| Set at break (%) | 92 | 136 | 180 | 88 | 128 | 168 | 76 | 112 | 164 |

What is claimed is:

1. A polymer composition comprising a selectively hydrogenated vinylaromatic compound/conjugated alkadiene block copolymer, a thermoplastic engineering polyalkylene polymer and a liquid, low molecular weight poly(alkylene) plasticizer.

2. The composition of claim 1 wherein the thermoplastic engineering polyalkylene polymer has a weight average molecular weight above 6000.

3. The composition of claim 2 wherein the plasticizer has a number average molecular weight of from about 1200 to about 4500 and is a polymer of propylene, 1-butene, isobutylene or mixtures thereof, or a poly(aryl-substituted alkylene) wherein the aryl-substituted alkylene is predominantly α-methylstyrene.

4. The composition of claim 3 wherein the selectively hydrogenated block copolymer is a selectively hydrogenated block copolymer of styrene and butadiene or isoprene.

5. The composition of claim 4 wherein the plasticizer is present in a quantity of from about 5 parts by weight to about 200 parts by weight per 100 parts by weight of block copolymer.

6. The composition of the invention wherein the plasticizer is a polymer of 1-butene or isobutylene.

7. The composition of claim 5 wherein the thermoplastic engineering polyalkylene polymer has an initial melt flow of from 0.2 dg/min to 20 dg/min at 230° C. and a 2.16 kg load.

8. The composition of claim 7 wherein the thermoplastic engineering polymer is present in a quantity of from about 5 parts by weight to about 500 parts by weight per 100 parts by weight of block copolymer.

9. The composition of claim 8 wherein the selectively hydrogenated block copolymer is a selectively hydrogenated block copolymer of styrene and butadiene.

10. The composition of claim 8 wherein the selectively hydrogenated block copolymer is a selectively hydrogenated block copolymer of styrene and isoprene.

11. In compositions comprising selectively hydrogenated vinylaromatic compound/conjugated alkadiene block copolymer, thermoplastic engineering polyalkylene polymer and a plasticizer, the improvement of employing as plasticizer a liquid, low molecular weight polymer of propylene, 1-butene or isobutylene, or mixtures thereof, or a poly(aryl-substituted alkylene) derived predominantly from α-methylstyrene.

12. The composition of claim 11 wherein the plasticizer is a polymer of 1-butene or butylene of number average molecular weight from about 1200 to about 4500.

13. The composition of claim 11 wherein the plasticizer is poly(aryl-substituted alkylene) having a ring and ball softening point between 20° C. and 140° C.

14. The composition of claim 11 wherein the plasticizer is present in a quantity from about 5 parts by weight to about 200 parts by weight per 100 parts by weight of the block copolymer.

* * * * *